(12) United States Patent
Stewart et al.

(10) Patent No.: US 6,422,230 B1
(45) Date of Patent: Jul. 23, 2002

(54) COLLAPSIBLE STAND AND BARBECUE GRILL ASSEMBLY

(75) Inventors: Daniel M. Stewart; Michael R. Giebel, both of Joplin, MO (US); Danene Jaffe, Weston, FL (US); Richard A. Whitehall; Tucker H. Fort, both of New York, NY (US); Jesse D. Gala, Summit, NJ (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 09/631,052

(22) Filed: Jul. 31, 2000

(51) Int. Cl.[7] .............................. F24B 3/00; A47J 37/00; F24C 1/16
(52) U.S. Cl. .................. 126/25 R; 126/9 R; 126/41 R; 280/645
(58) Field of Search .............................. 126/41 R, 25 R, 126/9 R, 9 B, 1 R, 25 A, 38, 59, 153, 276; 99/339, 340, 449; 280/645, 641, 652

(56) References Cited

U.S. PATENT DOCUMENTS

| | | |
|---|---|---|
| 4,492,215 A | 1/1985 | DiGianvittorio |
| 4,541,406 A | 9/1985 | DaSambiagio |
| 4,884,499 A | 12/1989 | Rensch et al. |
| 5,065,734 A | 11/1991 | Elliott |
| 5,094,221 A | 3/1992 | Ho |

*Primary Examiner*—Henry Bennett
*Assistant Examiner*—Josiah C. Cocks
(74) *Attorney, Agent, or Firm*—Kramer, Levin, Naftalis & Frankel LLP

(57) ABSTRACT

A foldable or collapsible stand is provided for supporting a barbecue grill assembly. The foldable or collapsible stand includes a first leg assembly having a first pair of intersecting leg members pivotally mounted to each other and a second leg assembly having a second pair of intersecting leg members pivotally mounted to each other. At least one leg member of each of the first pair and second pair of intersecting leg members have a pivot point along a length of the at least one leg member for folding the at least one leg member. The first pair of intersecting leg members and second pair of intersecting leg members pivot with respect to each other and the at least one leg member of each of the first pair and second pair of intersecting leg members fold along the pivot point to move the first leg assembly, the second leg assembly and barbecue grill between an upright position and a collapsed position.

16 Claims, 9 Drawing Sheets

COLLAPSIBLE STAND AND BARBECUE GRILL ASSEMBLY

FIELD OF THE INVENTION

The present invention is generally directed to a barbecue grill and stand assembly and, more specifically, to a barbecue grill having a collapsible stand that may be collapsed for ease of assembly and disassembly as well as portability.

BACKGROUND OF THE INVENTION

Barbecue grills come in a variety of sizes and configurations, ranging from the very small and portable hibachi-type grills to the more elaborate gas-type grills. Whether large or small, simple or elaborate, barbecue grills are a mainstay of outdoor summer recreation.

Because of the popularity of barbecue grills and their common and popular use in venues outside of the backyard (e.g., parks and beaches), portable barbecue grills are known. For example, barbecue grills are known having collapsible or foldable stands or carts. However, such prior art designs are typically bulky and not easily foldable. Accordingly, a need continues to exist for a barbecue grill having an easily foldable stand or cart. A further need exists for a barbecue grill assembly with a collapsible stand that collapses into a compact size for ease of transportation.

SUMMARY OF THE INVENTION

Generally, in accordance with the present invention, a barbecue grill assembly is provided that includes a collapsible or foldable support assembly or stand for moving the barbecue grill assembly between an upright position and a folded or collapsed position. In an exemplary embodiment, the collapsible or foldable stand is comprised of a first leg assembly comprising a pair of intersecting leg members pivotally connected to each other and pivotally mounted to a barbecue grill. A second leg assembly is provided comprising a second pair of intersecting leg members having the leg members pivotally connected to each other and also pivotally mounted to the barbecue grill. At least one leg member of each of the first pair and second pair of intersecting leg members has a pivot point along a length of the at least one leg member for folding the at least one leg member. The first pair of intersecting leg members and second pair of intersecting leg members pivot with respect to each other and the at least one leg member of each of the first pair and second pair of intersecting leg members fold along the pivot point to move the first leg assembly, the second leg assembly and barbecue grill between an upright position and a collapsed position.

In accordance with a further aspect of the present invention, a tray is provided between the first and second leg assemblies for mounting a gas tank. The leg members of the first and second leg assemblies are pivotally connected to the tray at opposite sides and ends thereof.

In accordance with still another aspect of the present invention, each of the intersecting leg members of each of the first and second leg assemblies includes a wheel and skid resistant foot/handle, respectively.

In accordance with yet another aspect of the present invention a locking mechanism is provided for maintaining the barbecue grill assembly in the upright position.

The above and other features and aspects of the present invention will become readily apparent from the following detailed description thereof which is to be read in connection with the accompanying drawings.

BRIEF DESCRIPTION OF THE DRAWINGS

For a fuller understanding of the invention, reference is had to the following description, taken in connection with the accompanying drawings, in which.

DETAILED DESCRIPTION

Figure 1:
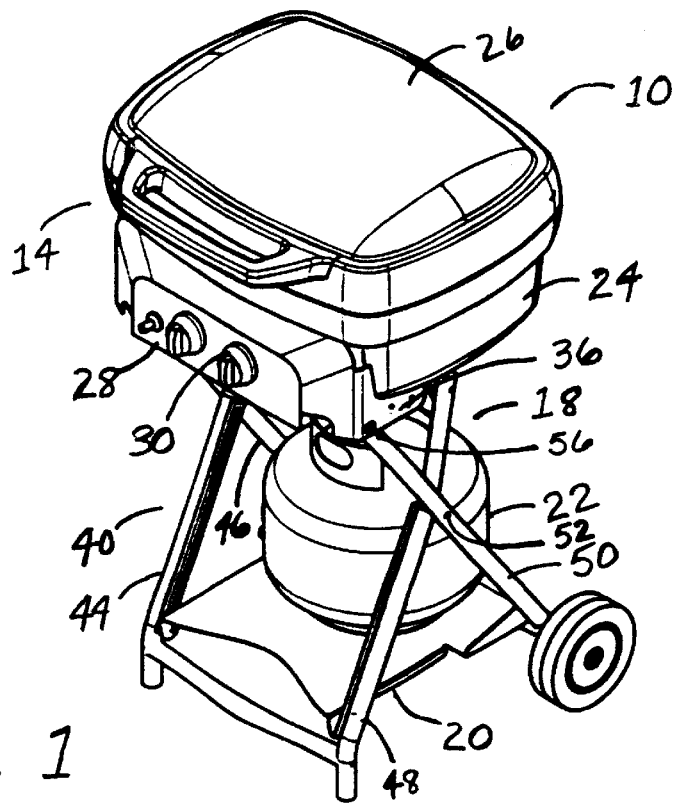
FIG. 1 is a front perspective view of a barbecue grill and stand assembly according to an exemplary embodiment of the present invention.
Figure 2:
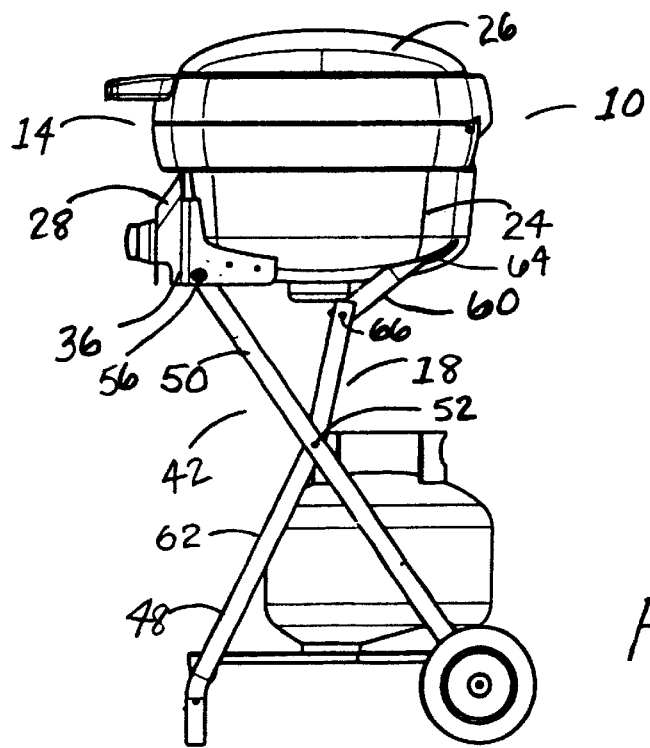
FIG. 2 is a right-side, elevational view of the barbecue grill and stand assembly with the stand fully extended.
Figure 3:
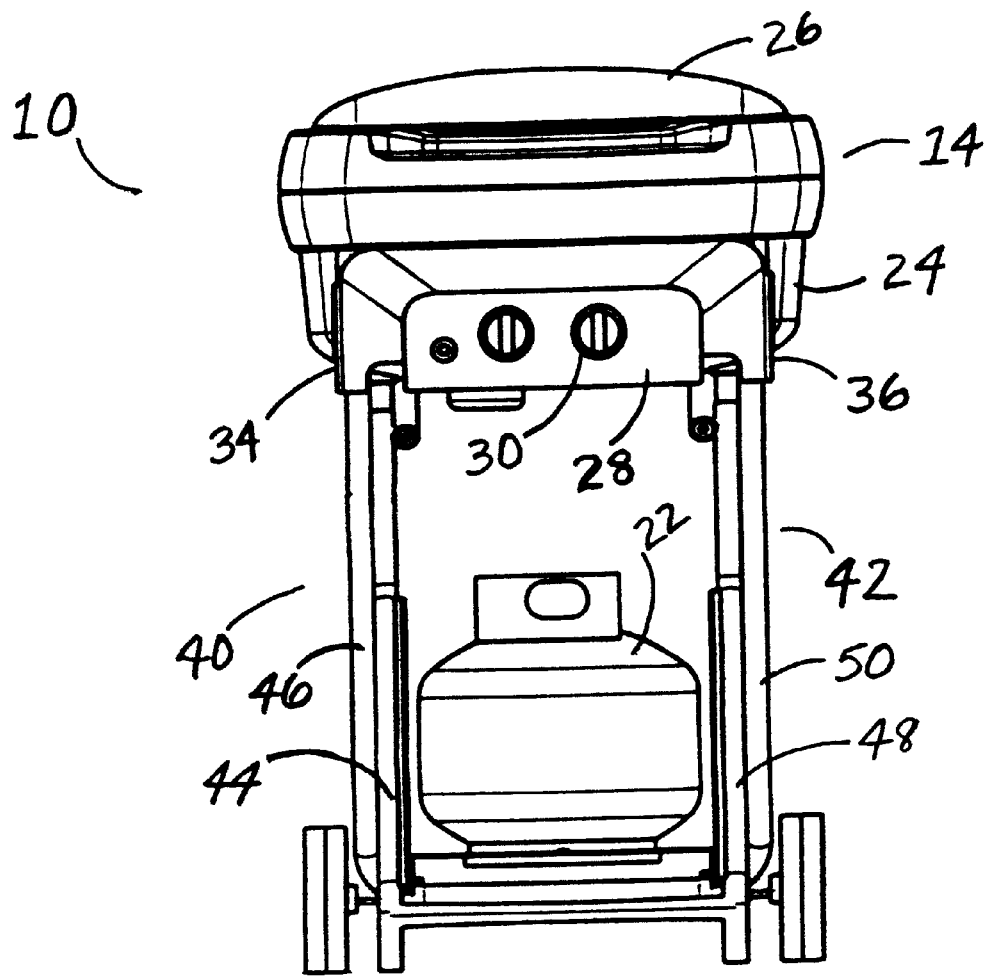
FIG. 3 is a front, elevational view of the barbecue grill and stand assembly with the stand fully extended.

Referring to FIGS. 1–3, a barbecue grill and stand assembly is generally shown as reference numeral 10. The barbecue grill and stand assembly generally comprises a barbecue grill casting which is generally shown as 14, a collapsible or foldable stand generally shown as 18, a tray 20 and gas tank 22.

The barbecue grill casting 14 is of a generally conventional structure and is made, for example, of aluminum. The barbecue grill casting 14 comprises a bowl 24 and pivotally connected hood 26. The bowl 24 includes a panel 28 along a front edge portion thereof for mounting one or more control knobs 30 for controlling the flow of gas from the gas tank 22 to the casting 14. As shown in FIGS. 1 and 2, the panel 28 includes opposing lateral walls 34, 36 to which is pivotally connected the collapsible or foldable stand 18.

Referring further to FIGS. 1 and 2, the collapsible or foldable stand 18 comprises a first leg assembly and a second leg assembly generally shown as 40 and 42, respectively. The first and second leg assemblies 40, 42 are mounted parallel to each other on opposite sides of tray 20 and barbecue grill casting 14. More specifically, as shown in FIG. 1, first leg assembly 40 is comprised of intersecting leg members 44, 46 and the second leg assembly 42 is comprised of intersecting leg members 48, 50. The intersecting leg members 44 and 46 are pivotally joined to each other along pivot axis 52. Similarly, the intersecting leg members 48 and 50 are pivotally joined along a pivot axis 52. As should be appreciated, such a configuration permits leg assemblies 40 and 42 to move in a substantially scissors-like manner.

In the exemplary embodiment of the present invention, leg members 46 and 50 consist of a single length of steel, aluminum or similar type material that extends between the casting 14 and tray 22. The leg members 46 and 50 are pivotally connected at their upper ends along pivot axes 56, 56 which pass through the lateral walls 34, 36 of the panel 28. Adjacent their lower ends, the leg members 46 and 50 are pivotally connected to opposite sides of tray 22 which extends between first and second leg assemblies 40, 42. A headed rivet, pivot pin or bolt may be used to create the pivot axes at the upper and lower ends of leg members 44 and 50.

Also in the exemplary embodiment of the present invention, leg members 44 and 48 are each comprised of two segment lengths 60, 62 of steel, aluminum or similar type material. The first segment 60 is pivotally connected at a first end to the casting 14 along pivot axis 64 and at the opposite end is pivotally connected along pivot axis 66 to the top or first end of second segment 62. The opposite end of second segment is pivotally connected to tray 22. Again, the pivot axes 64 and 66 may be defined by a bolt, pivot pin or headed rivet. As shown in FIG. 2, segment 62 includes a slight bend or turn in the exemplary embodiment of the present invention.

Figure 4:
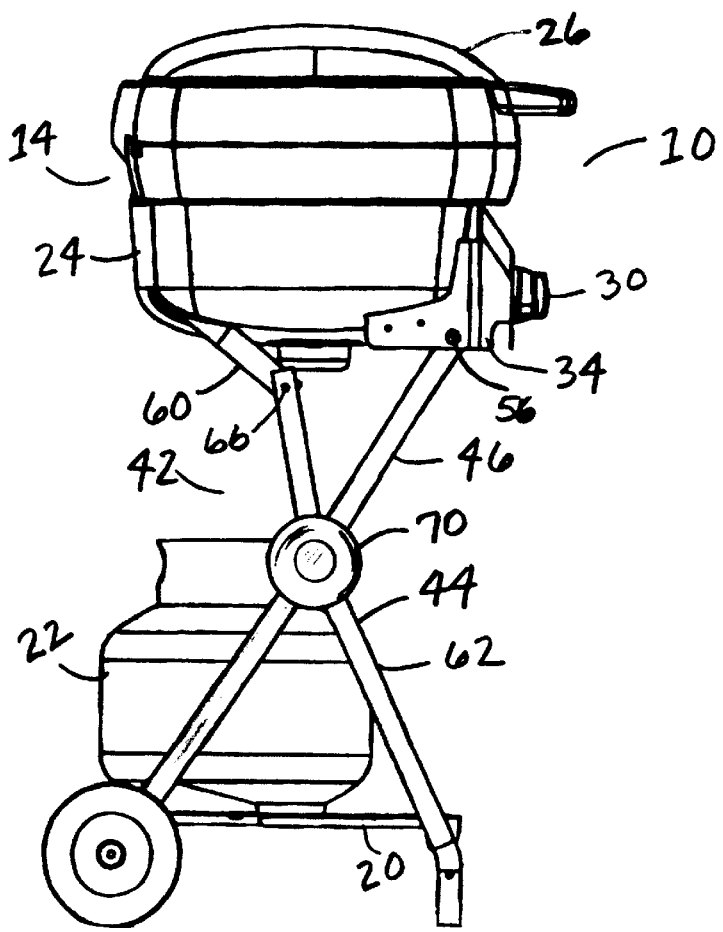
FIG. 4 is a left-side, elevational view of the barbecue grill and stand assembly with the stand fully extended including a locking mechanism according to an exemplary embodiment of the present invention.
Figure 5:
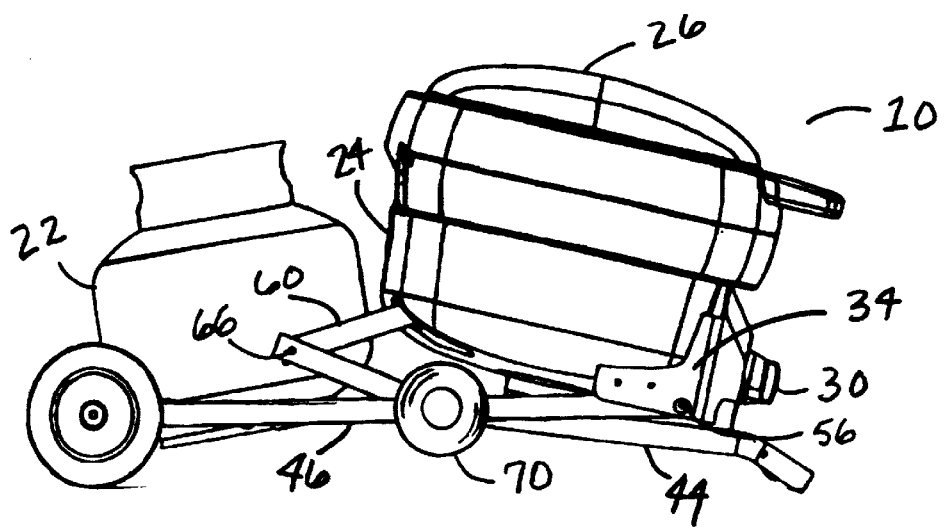
FIG. 5 is a left-side view thereof with the stand in a collapsed position.
Figure 6:
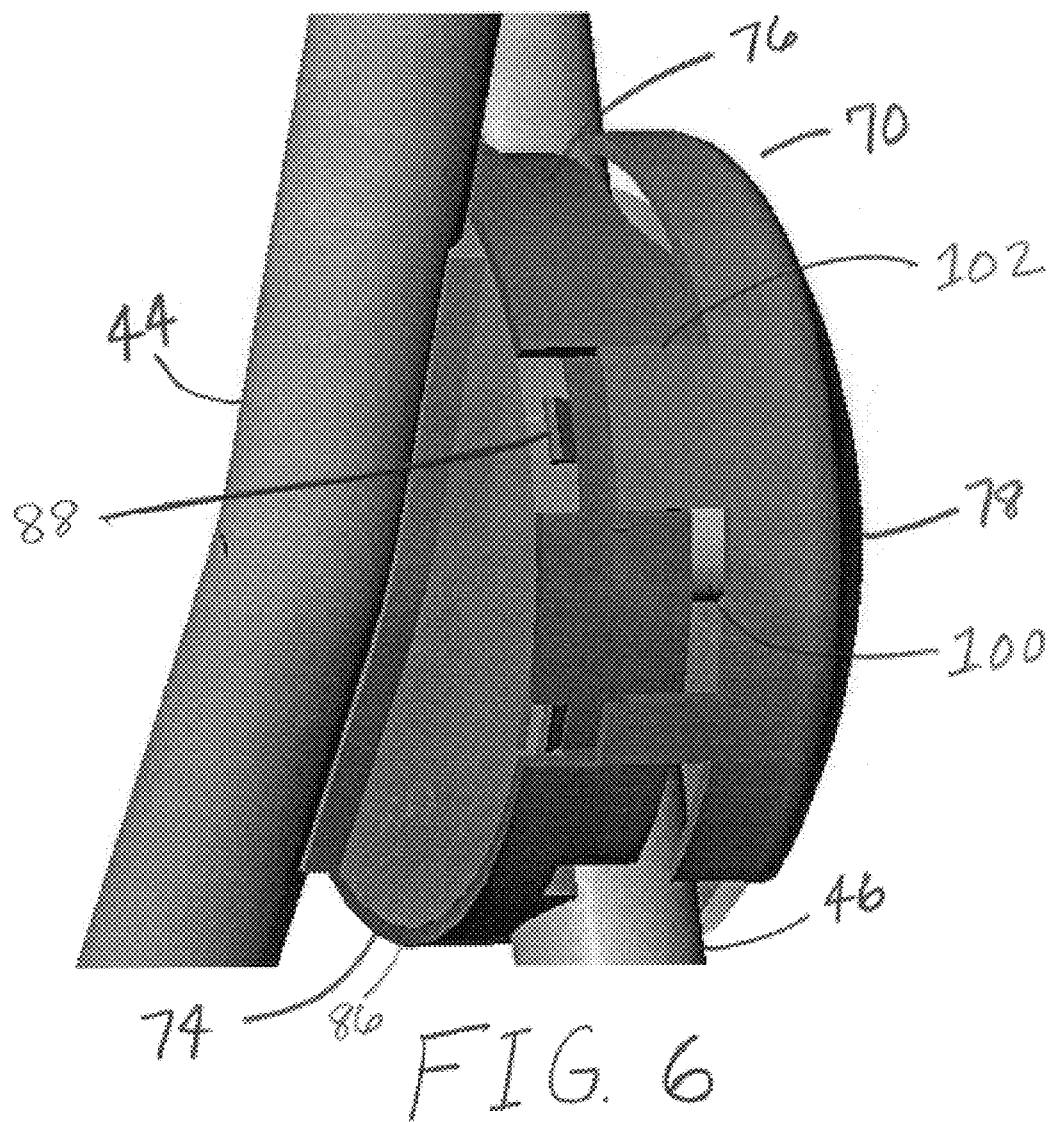
FIG. 6 is a detailed view of a pivot mechanism according an exemplary embodiment of the present invention.
Figure 7:
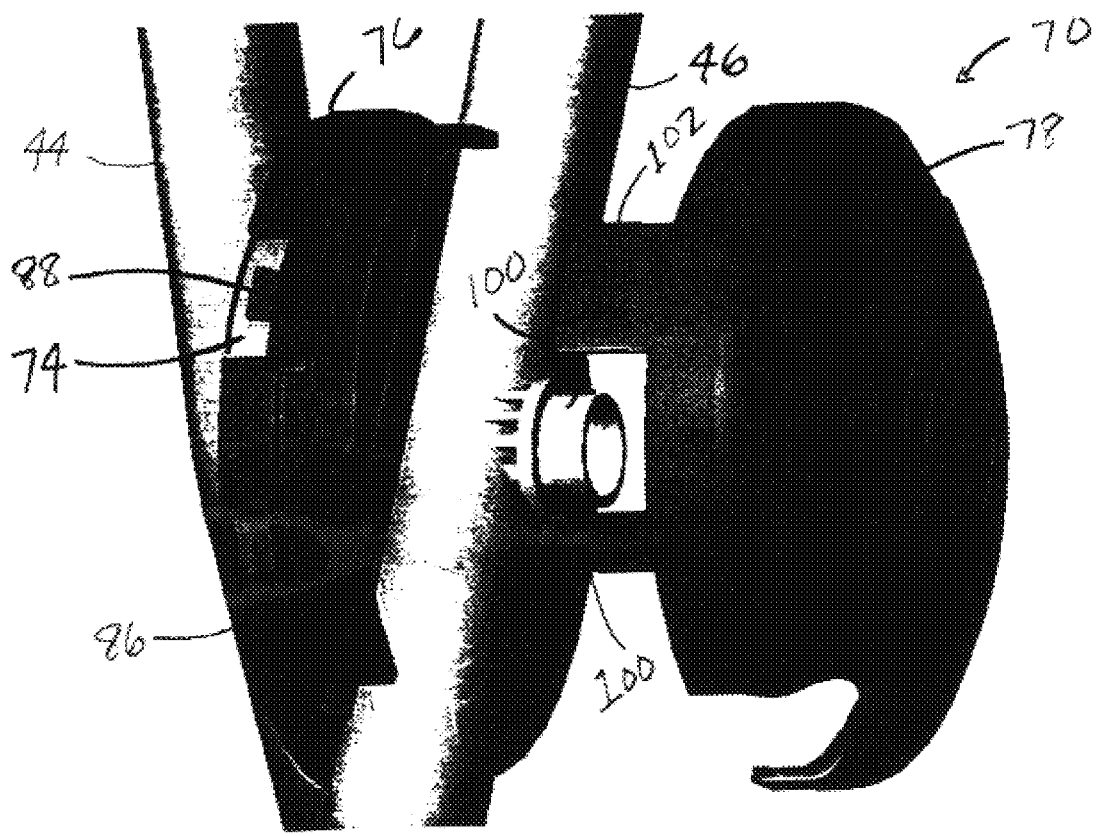
FIG. 7 is an exploded view of the pivot mechanism according an exemplary embodiment of the present invention.
Figure 10A:
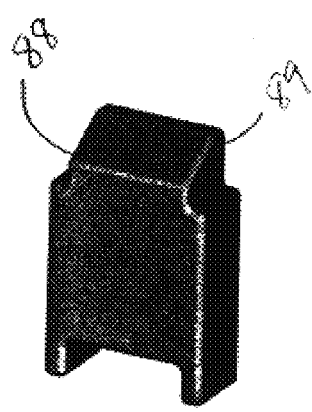
FIGS. 8a, 8b, 9a, 9b, 10a and 10b are detailed views of the various components that comprise the pivot mechanism according an exemplary embodiment of the present invention.
Figure 10B:
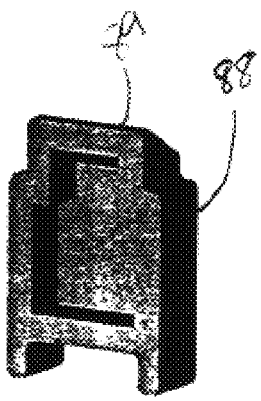
Figure 8A:
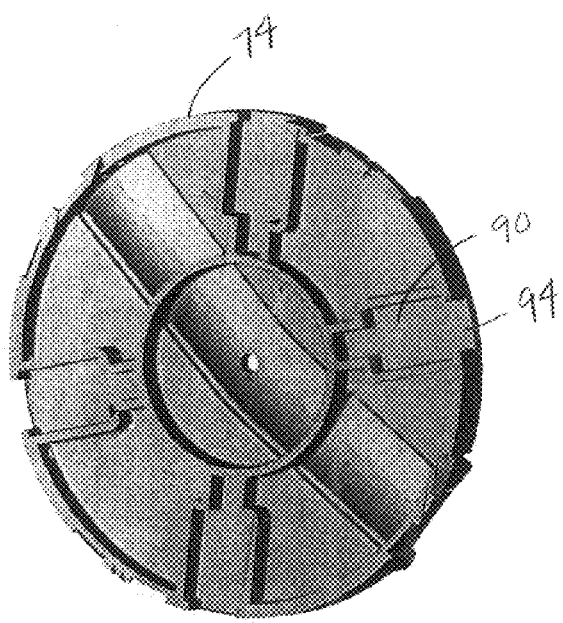
Figure 8B:
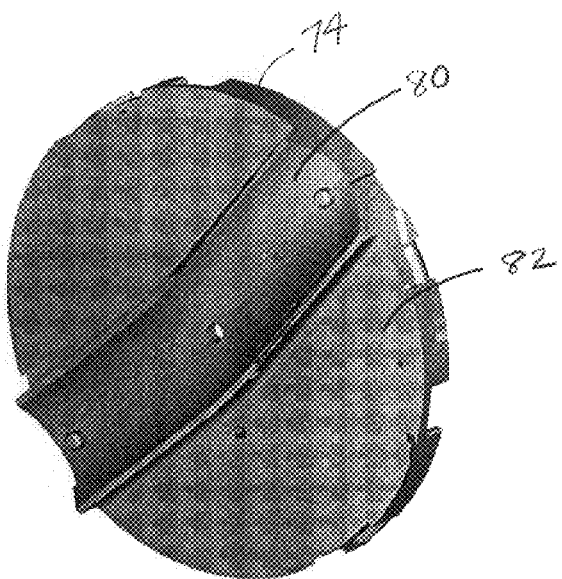
Figure 9A:
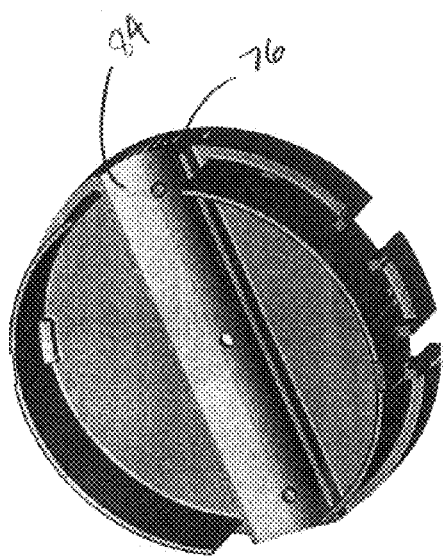
Figure 9B:
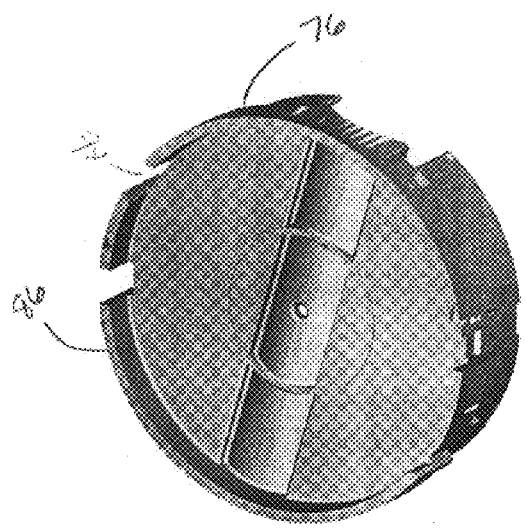

Referring now to FIGS. 4 and 5, a barbecue grill and stand assembly 10 is shown including a locking mechanism generally shown at 70 for maintaining the legs assemblies 40, 42 in either an open, upright position (see FIG. 4) or collapsed position (see FIG. 5). In an exemplary embodiment, the locking mechanism 70 is mounted between leg members 44 and 46 of leg assembly 42. However, locking mechanism 70 may be connected between leg member 48 and 50 of leg assembly 42 or between the leg members of both the first and second leg assemblies 40, 42. As shown in FIGS. 6 and 7, locking mechanism 70 is mounted along pivot axis 52 between leg members 44 and 46.

As depicted in detail in FIGS. 6–10b, the locking mechanism 70 preferably comprises an inside mounting plate 74, intermediate mounting plate 76 and actuator cap 78. The inside and intermediate plates 74, 76 are disposed between leg members 44 and 46 as shown in FIGS. 6 and 7. More particularly, inside plate 74 includes a leg-shaped channel or groove 80 that bisects a rear face 82 of inside plate 74 and receives second segment 62 of leg member 46 as shown in FIGS. 6 and 8b. Intermediate plate 76 is mounted to inside plate 74 along pivot axis 52 and secured thereto by the bolt, pivot pin or headed rivet (not shown) that defines pivot axis 52. The intermediate plate 76 also includes a leg-shaped channel or groove 84 that receives leg member 46 as shown in FIGS. 7 and 9a. Leg member 46 is secured thereto also along pivot axis 52.

The inside plate 74 sits within intermediate plate 76 behind a circumferential lip 86 that extends from intermediate plate 76. Since inside plate 74 has a slightly smaller diameter than intermediate plate 76, inside plate 74 and intermediate plate 76 may rotate freely with respect to one another along the full range of motion defined by pivot axis 52.

One or more locks 88 are provided along the circumference of plates 74, 76 that when engaged prevent plates 74 and 76 from rotating with respect to each other. As shown in FIGS. 6 and 7, the locks 88 are mounted between inside plate 74 and intermediate plate 76. The lock 88 is spring loaded within recess 90 of inside plate 74 (See FIG. 8a). As shown in FIGS. 6 and 7 only the ends 89 of locks 88 extend beyond the outer diameter of inside plate 74 through openings 94. The locks 88 may be disengaged by actuator cap 78 in order to move the stand 18 between an upright position and a collapsed position.

The actuator cap 78 is mounted to leg member 46 with a resilient spring (not shown) that is retained within a spacer 100 mounted to leg 46. The spring biases cap actuator away from leg member 46. The actuator cap 78 includes one or more actuator tabs 102 that for disengaging locks 88. As shown in FIGS. 6 and 7, tabs 102 engage locks 88 through a plurality of openings 98 provided in lip 86 of intermediate plate 76. When the actuator cap 78 is depressed the actuator tabs 102 disengage the locks 88 by depressing the spring-loaded locks 88 inwardly within recess 90. With the locks 88 released the leg members of leg assemblies 40, 42 are free o pivot along axes 52, 52. Thus, when the leg assemblies 40, 42 are in the open position, by depressing the actuator cap 78 the leg member are released to the collapse the stand 18. When the leg assemblies 40, 42 are in the collapsed position, by depressing the actuator cap 78 the legs members are released to rotate the stand into the open, upright position.

Figure 11:
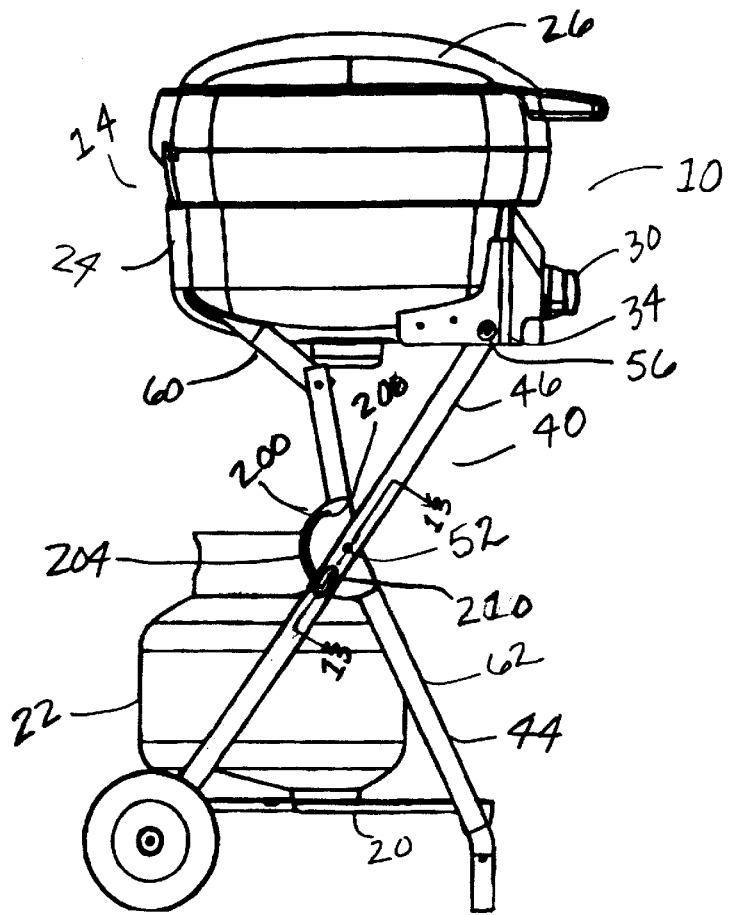
FIG. 11 is a left-side, elevational view of the barbecue grill and stand assembly with the stand fully extended including a locking mechanism according to an alternative exemplary embodiment of the present invention.
Figure 12:
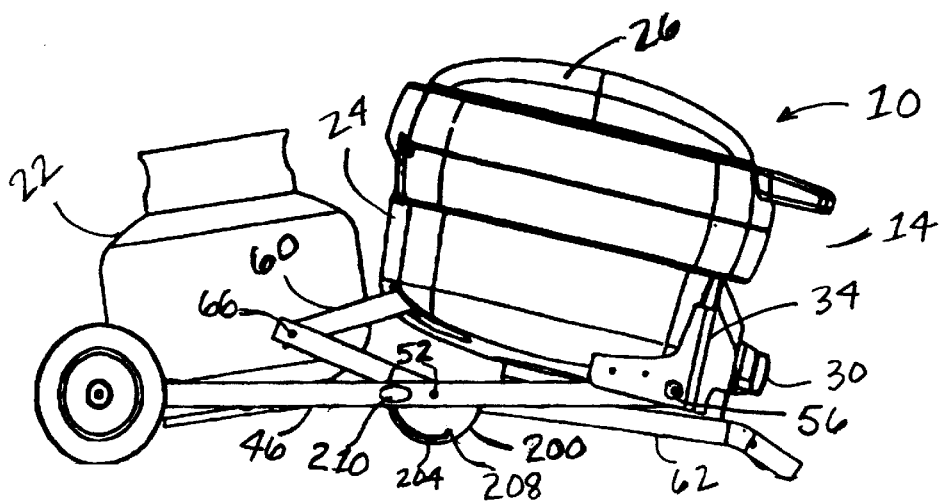
FIG. 12 is a left-side view thereof with the stand in a collapsed position.

An alternative example of a locking mechanism 200 is depicted in FIGS. 11 and 12. The locking mechanism 200 comprises a generally semi-circular plate mounted between the intersecting leg members of at least one of leg assembly 40 and 42. In an exemplary embodiment, the locking mechanism 200 is mounted between leg members 44 and 46 of the first leg assembly 40 along pivot axis 52. The plate may be secured to leg member 44 such as by welding or riveting.

As shown in FIGS. 11 and 12, the plate includes a detented ridge 204 that extends between an upper locking slot 206 and a lower locking slot 208. A spring loaded handle 210 is provided for locking and unlocking mechanism 200. As shown in FIG. 11, when leg assemblies 40 and 42 are in an upright position, handle 210 is positioned within lower locking slot 208. As shown in FIG. 12, when leg assemblies 40 and 42 are in a collapsed position, locking handle 210 is positioned within upper locking slot 206.

Figure 13:
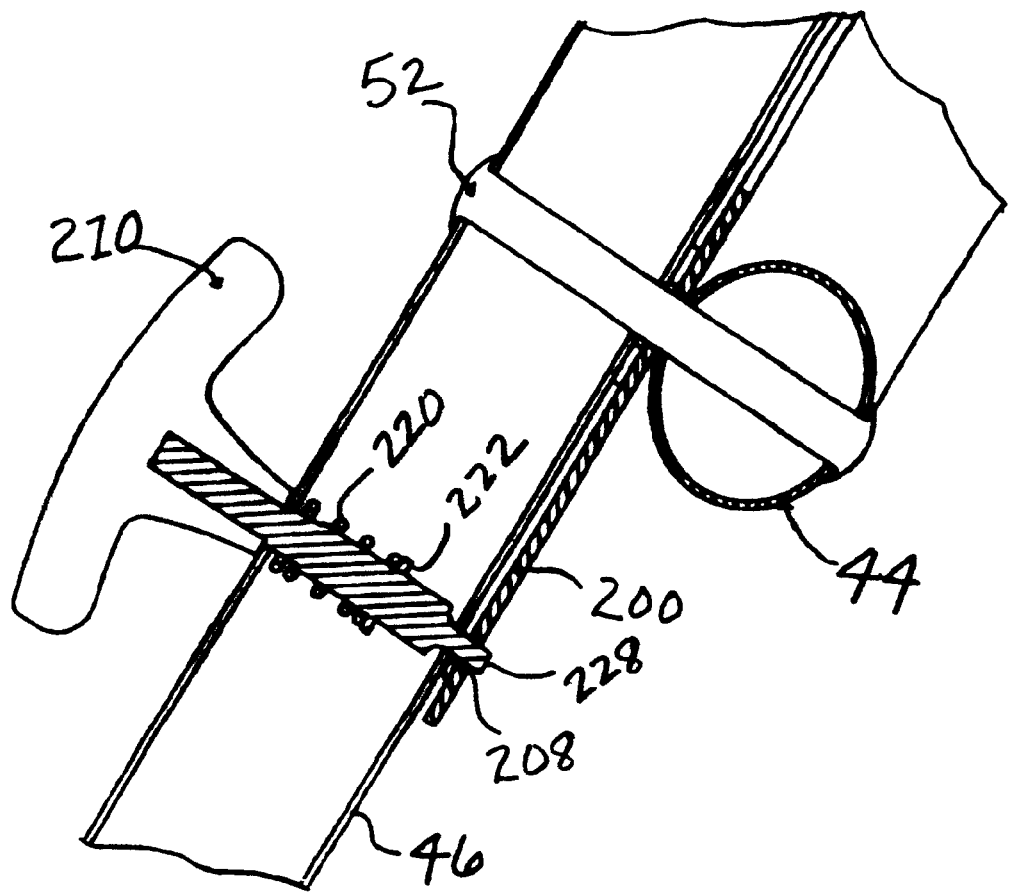
FIG. 13 is a partial cross-section taken along the line 13—13 of FIG. 11.

Referring now to FIG. 13, the locking handle extends within leg member 46 and is captured therein by spring 220 and step 222. The handle includes an extension 228 that mates with locking slots 206 and 208. In order to move the legs between the upright position and the collapsed position, the handle is retracted until the extension 228 is retracted from either locking slot 206 or 208. When the extension 228 is retracted, the leg members of leg assemblies 40 and 42 are free to pivot along axis 52 to move between the upright position and collapsed position.

Referring to FIGS. 5 and 12, barbecue grill and stand assembly 10 is depicted in the collapsed position. As shown in FIGS. 5 and 12, when locking mechanisms 70 and 200 are released, leg members 46 and 50 pivot downwardly toward tray 20. At the same time, leg members 44 and 48 begin to collapse in multiple segments along pivot axes 66, 66. The first segment 60 rotates away from the casting 14 while segment 62 pivots downwardly toward tray 20. In the final steps, as shown in FIGS. 5 and 12, casting 14 is fully collapsed adjacent tray 20 and segment 60 has pivoted toward segment 62.

Additionally as shown in FIGS. 1–5 and 11–12, leg members 46 and 50 are joined at a lower end by an axle or cross member that mounts wheels 230, 230. Furthermore leg members 44 and 48 include skid resistant feet/handles 240, 240. Feet 240, 240 are preferably configured to permit a consumer to grip the feet as handles when the fully collapsed assembly as shown in FIGS. 5 and 12 is being carted away for storage or taken to a new location.

It will thus be seen that the aspects of the present invention set forth above, among those made apparent from the preceding description, are efficiently attained and, since certain changes may be made in carrying out the above method and in the product set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A barbecue grill assembly comprising:
    a barbecue grill;
    a support assembly for mounting said barbecue grill and moving said barbecue grill between an upright position and a folded position, said collapsible support assembly comprising first and second leg assemblies, each said leg assembly comprising a pair of intersecting leg members pivotally mounted to each other and pivotally mounted at a first end to said barbecue grill;
    at least one leg member of each of said first pair and second pair of intersecting leg members including first and second segments pivotally connected to each other at one end to pivot about a pivot axis for folding said at least one leg member; and
    said first pair and second pair of intersecting leg members pivoting with respect to each other and said first and second segments pivoting with respect to each other to move said support assembly and barbecue grill between said upright and folded positions.

2. The barbecue grill assembly of claim 1 further comprising a platform extending between said leg assemblies for supporting a gas tank.

3. The barbecue grill assembly of claim 1 further comprising a locking mechanism for locking said support assembly in one of at least said upright position and said folded position.

4. The barbecue grill assembly of claim 3 wherein said locking mechanism is disposed between said pair of intersecting leg members of at least one of said first and second leg assemblies.

5. The barbecue grill assembly of claim 1 wherein said barbecue grill assembly further comprises a pair of wheels mounted to said collapsible support assembly.

6. The barbecue grill assembly of claim 1 wherein each of said leg members of each of said leg assemblies terminates in a handle and wheel, respectively.

7. A collapsible stand and barbecue grill assembly comprising:
    a barbecue grill;
    a first leg assembly comprising a first pair of intersecting leg members, each of said intersecting leg members pivotally connected to each other;
    a second leg assembly comprising a second pair of intersecting leg members, each said intersecting leg member pivotally connected to each other;
    means for pivotally connecting said first and second leg assemblies to opposite sides of said barbecue grill;
    at least one leg member of each of said first pair and second pair of intersecting leg members having a pivot point along a length of said at least one leg member for folding said at least one leg member; and
    said first pair of intersecting leg members and second pair of intersecting leg members pivoting with respect to each other and said at least one leg member of each of said first pair and second pair of intersecting leg members folding along said pivot point to move said first leg assembly, said second leg assembly and barbecue grill between an upright position and a collapsed position.

8. The collapsible stand and barbecue grill assembly of claim 7 further comprising a platform extending between said first and second leg assemblies for supporting a gas tank.

9. The collapsible stand and barbecue grill assembly of claim 7 further comprising a locking mechanism for locking said first and second leg assemblies in one of at least said upright position and said collapsed position.

10. The collapsible stand and barbecue grill assembly of claim 9 wherein said locking mechanism is disposed between at least one of said first pair and said second pair of intersecting leg members.

11. The collapsible stand and barbecue grill assembly of claim 7 wherein each of said leg members of each of said first and second leg assemblies terminates in a handle and wheel, respectively.

12. A collapsible stand for supporting a barbecue grill assembly comprising:
    a first pair of intersecting leg members, each leg member pivotally connected to each other and having means located adjacent an upper end thereof for pivotally connecting said leg members to a barbecue grill assembly;
    a second pair of intersecting leg members pivotally connected to each other and having means located adjacent an upper end thereof for pivotally connecting said leg members to a barbecue grill assembly;
    at least one leg member of each of said first pair and second pair of intersecting leg members having a pivot point along a length of said leg member for folding said at least one leg member; and
    said first pair of intersecting leg members and second pair of intersecting leg members pivoting with respect to each other and said at least one leg member of each of said first pair and second pair of intersecting leg members folding along said pivot point to move said collapsible stand between an upright position and a collapsed position.

13. The barbecue grill assembly of claim 11 further comprising a platform extending between said first pair and second pair of intersecting leg members for supporting a gas tank.

14. The barbecue grill assembly of claim 11 further comprising a locking mechanism for locking said collapsible stand in at least one of said upright position and said collapsed position.

15. The barbecue grill assembly of claim 14 wherein said locking mechanism is disposed between at least one of said first pair and second pair of intersecting leg members.

16. The barbecue grill assembly of claim 11 wherein said barbecue grill assembly further comprises a wheel mounted to at least one leg member of each of said first and second pairs of intersecting leg members.

* * * * *